(No Model.)
W. J. BRUCE.
WHEELBARROW WHEEL.
No. 309,193. Patented Dec. 16, 1884.
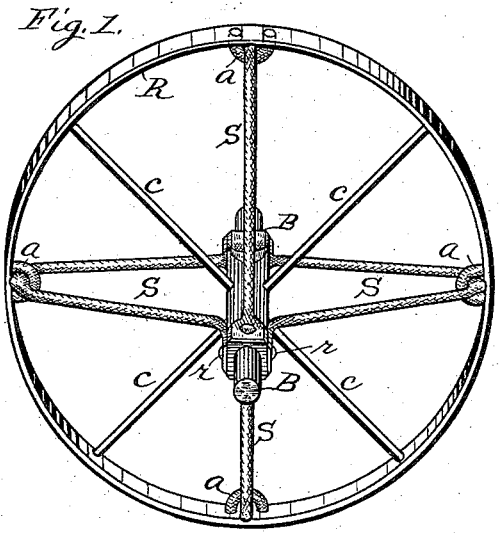
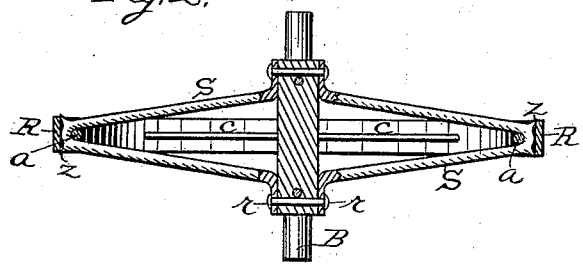
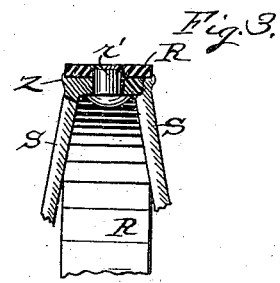
Witnesses.
Thos. H. Hutchins.
Wm. J. Hutchins.
Inventor
William J. Bruce.

UNITED STATES PATENT OFFICE.

WILLIAM J. BRUCE, OF LOCKPORT, ILLINOIS.

WHEELBARROW-WHEEL.

SPECIFICATION forming part of Letters Patent No. 309,193, dated December 16, 1884.

Application filed April 28, 1884. (No model.)

*To all whom it may concern:*

Be it known that I, WILLIAM J. BRUCE, a citizen of the United States of America, residing at Lockport, in the county of Will and State of Illinois, have invented certain new and useful Improvements in Wheelbarrow-Wheels, of which the following is a specification, reference being had therein to the accompanying drawings.

Figure 1 is a perspective view; Fig. 2, a central cross-section, and Fig. 3 a cross-section of the rim at the place where it is riveted to a spoke.

This invention relates to certain improvements in wheelbarrow-wheels, which improvements are fully set forth and explained in the following specification and claim.

Referring to the drawings, B is the nave or hub of the wheel, S and C the spokes, and R the rim. The entire wheel is intended to be made of metal; but it it may be made in part of wood, if desired.

The principal new feature in this invention consists in the manner in which the spokes are constructed and applied or attached to the rim and hub. There are two kinds of spokes—the spokes proper, S, which are permanently fixed to the nave or hub and rim to connect them together, and the spokes C, which serve only to support the rim between the other spokes to prevent the rim from being flattened inwardly toward the hub at those points. These supporting-spokes C are not fixed permanently to either the hub or rim, but stand in recesses of sufficient depth to prevent their falling out. The foot of each spoke S is bent to stand on the hub, and secured thereto by a rivet, *r*, passing through, or by any other suitable means. The outer ends of the pair of spokes S are united and integral with each other, and stand on the inner surface of the rim, to which they are permanently attached, in the manner shown in Fig. 1, particularly, by means of the clips *a*, which stride the crotch between the spokes and pass out through the rim and are riveted therein; or a single rivet, *r'*, may be used, as shown in Fig. 3, to unite the spokes to the rim; but I deem the fastening shown in Fig. 1 preferable. The spokes S diverge from the rim, so that their feet may stand near the outer ends of the hub to brace the wheel thoroughly. The outer ends of the spokes S, where they stand on the rim, are formed to present a wide bearing on the rim, and with overhanging ears or lugs Z to inclose the rim, as shown, particularly to assist in holding the spoke in place on the rim. These spokes S may be applied to a wheel having a wooden hub and rim; but it is preferable to construct the entire wheel of metal. The strength of the wheel is greatly increased by forming two spokes of a single rod of metal, and having their outer ends formed so as to present a good standing-surface on the rim; also the wheel is stronger by standing the spokes S opposite each other than it would be to alternate the spokes with the relation to each other on the opposite sides of the rim. The spokes C have no other office to fill than to support the rim between the spokes S. The whole makes a wheelbarrow-wheel of very great strength and durability, especially for use in a quarry, &c.

Having thus described my invention, what I claim as new, and desire to secure by Letters Patent, is as follows, to wit:

The combination of the hub B, rim R, supporting-spokes C, and spokes S, having the lugs Z, and formed of a single rod of metal and secured to said rim by the clips *a*, and to the hub by means of the rivets *r*, said supporting-spokes being arranged to stand in proper recesses in both the hub and rim between said spokes S for supporting the rim at that place, all as and for the purpose set forth.

WILLIAM J. BRUCE.

Witnesses:
T. H. HUTCHINS,
WM. J. HUTCHINS.